UNITED STATES PATENT OFFICE.

GEORGE P. P. NICOLAOU, OF SALISBURY, NORTH CAROLINA.

FOOD COMPOUND.

1,012,415.     Specification of Letters Patent.     Patented Dec. 19, 1911.

No Drawing.     Application filed July 20, 1911. Serial No. 639,598.

*To all whom it may concern:*

Be it known that I, GEORGE P. P. NICOLAOU, a subject of the Sultan of Turkey, and a resident of Salisbury, in the county of Rowan, State of North Carolina, have invented a new and useful Improvement in Food Compounds, of which the following is a specification.

This invention relates to food compounds, and especially to such commodities as are intended for use in the preparation of fancy fillings, dressings, sauces, gravies, and the like, as hereinafter fully set forth and claimed.

A compound of the character herein indicated is prepared in the following manner, the several component parts being indicated as per relative weights: I take white or wheat flour and bake it from two to four or five hours, depending upon the strength and color desired, in an open shallow vessel, stirring the same every few minutes. To from sixty to eighty parts of this prepared white flour I add from ten to twenty parts of raw or baked corn starch, ten to twenty parts of raw or unbaked white flour, five to ten parts each of potato flour or rice flour, one part of cream of tartar, one part of prepared celery such as celery salt or pulverized celery, one or more parts of pungent seasoning such as black pepper, red pepper, white pepper, Jamaica ginger, and chilli powder, one or more parts of aromatic spices such as allspice, cinnamon, nutmeg, and mace, one or more parts of suitable pulverized tea leaves such as thyme, sage, sweet marjoram, and rosmarinus or rosemary, and usually one part of common salt or sodium chlorid. The ingredients thus prepared and compounded are thoroughly mixed or blended and the product is then ready for immediate use or it may be kept for an indefinitely long time in good condition.

From the foregoing it will be understood that the compound might be called a prepared baking flour, the flour and meal components largely predominating. In fact, this prepared flour is used in substantially the same manner as ordinary flour in the preparation of gravies, dressings, &c., and consequently is to be distinguished from a condiment consisting principally of salt pepper and other spices.

What I claim is:

The hereindescribed food compound comprising sixty parts baked white flour, ten parts baked corn starch, twenty parts raw white flour, ten parts raw corn starch, five parts rice flour, five parts potato flour, one part cream of tartar, one part celery salt one part red pepper, one part white pepper one part chilli powder, one part common salt, one part allspice, one part rosemary one part sweet marjoram, one part thyme and one part sage.

In testimony whereof I have hereunto affixed my signature in the presence of two subscribing witnesses.

GEORGE P. P. NICOLAOU.

Witnesses:
    H. C. ROBB,
    GEO. L. BEELER.